Patented Dec. 29, 1931

1,838,235

UNITED STATES PATENT OFFICE

RUDOLF SCHÜLE, OF FRANKFORT-ON-THE-MAIN, AND ERNST KORTEN, OF FRANKFORT-ON-THE-MAIN-FECHENHEIM, GERMANY, ASSIGNORS TO GENERAL ANILINE WORKS, INC., OF NEW YORK, N. Y., A CORPORATION OF DELAWARE

FAST AZODYESTUFFS AND PROCESS OF MAKING SAME

No Drawing. Application filed February 26, 1929, Serial No. 342,958, and in Germany February 28, 1928.

Our present invention relates to new azo dyestuffs and to a process of preparing the same, more particularly it relates to azo dyestuffs of the following general formula:

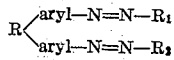

wherein R stands for a hydroaromatic residue, and $R_1$ and $R_2$ represent the residues of coupling components which may be equal or different and which may contain further $-N=N-$ aryl groups, and wherein all nuclei may be substituted.

The new dyestuffs are obtainable by coupling a tetrazo compound of a diamine of the general formula:

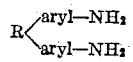

wherein R stands for a hydroaromatic residue and wherein the nuclei may contain substituents, with two molecular proportions of coupling components.

The diamines of the aforesaid general formula are obtainable by condensing a hydroaromatic ring ketone with two molecules of primary aromatic amines and are described in the copending application Serial No. 252,941, filed February 8, 1928.

Symmetrical dyestuffs of this kind are obtainable by combining 1 molecule of the tetrazo-compound with 2 molecules of a combining component. In order to produce asymmetrical dyestuffs, 1 molecule of the tetra-compound is first combined with 1 molecule of a combining component and the intermediate compound thus formed is further combined with another combining component. When the combining components themselves contain azo-groups, poly-azo-dyestuffs can be produced in this manner. Furthermore the disazo-dyestuffs mentioned above when containing primary amino-groups capable of being diazotized, may be again diazotized and combined with coupling components, yielding thereby also poly-azo-dyestuffs.

All these new dyestuffs are distinguished by a very good fastness to washing, milling and perspiration and meet all requirements of the practice. They dye especially wool and silk different shades.

Especially valuable dyestuffs are obtained when at least one of the coupling components is a naphthol sulfonic acid compound of the general formula:

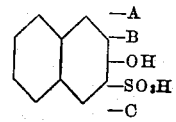

wherein A means hydrogen, OH or $NH_2$, B represents hydrogen or NH-acyl or O-acyl (acyl representing for instance an acetyl-, benzoyl- chloro- or di-chlorobenzoyl-, a benzene sulfonyl- or a toluene sulfonyl- group) or it stands for an $-N=N-$ aryl group and C stands for hydrogen or a sulfonic acid group.

In order to further illustrate our invention the following examples are given, the parts being by weight and all temperatures in centigrade degrees; but we wish it to be understood that our invention is not limited to the examples given, nor to the exact conditions stated therein.

EXAMPLE 1

(*Production of symmetrical disazo-dyestuffs*)

29.4 parts of 4.4'-diamino-3.3'-dimethyl-diphenyl-1.1'cyclohexane (obtainable by condensing 1 molecule of cyclohexanone with 2 molecules of ortho-toluidine) are suspended while stirring in about 200 parts of water. The suspension is mixed with 69 parts of hydrochloric acid (specific gravity=1.15) and tetrazotized at nearly 0° with 13.8 parts of sodium nitrite. This tetrazo-solution is introduced into a solution cooled to 0° containing 52.4 parts of the sodium salt of 2.8-dihydroxy-naphthalene-6-sulfonic acid and 66 parts of calcined soda. The reaction is finished by feebly warming the mass and the dyestuff thus formed is precipitated by the addition of common salt and filtered off. It corresponds probably to the formula:

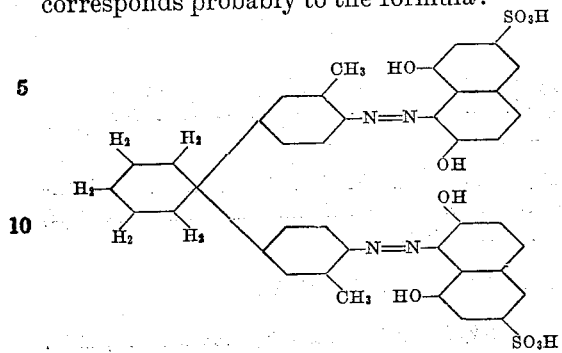

It represents a red powder dyeing wool and silk bluish red shades of an excellent fastness to light, washing, milling and perspiration.

When the tetrazo-compound used in this example is replaced by the corresponding 3.3'-dimethoxy or 3.3'-diethoxy compound, the same process yields dyestuffs of claret red and more bluish shades respectively which dyestuffs show otherwise likely good properties.

When instead of 2.8-dihydroxy-naphthalene-6-sulfonic acid its mono-benzene-sulfonic acid ester is applied as combining component, similar dyestuffs of a still better fastness are obtained. Analogous products result by aftertreating the first mentioned dyestuff in an alkaline solution with benzene sulfo-chloride or other aryl-sulfochlorides.

Other dyestuffs of this kind dye various shades, but of the same good fastness, as shown in the following table:

| Tetrazo compound of | Combining component | Shade |
| --- | --- | --- |
| 4.4'-diamino-diphenyl-4''-methyl-cyclohexane. | 1(4'sulfophenyl)-3-methyl-5-pyrazolone. | Yellow. |
| 4.4'diamino-3.3'dimethyl-diphenyl cyclohexane. | 1(4'toluene sulfamino)-8-hydroxy-naphthalene-3.6-disulfonic acid. | Bluish red. |
| 4.4'diamino-3.3'.dimethoxy-diphenyl-cyclohexane. | 1-benzoyl amino-8-hydroxy-naphthalene-3.6-disulfonic acid. | Violet. |

EXAMPLE 2

(*Production of asymmetrical disazodyestuffs*)

26.2 parts of 4.4'-diamino-diphenyl-cyclohexane are tetrazotized as described in Example 1 and mixed with 51.6 parts of sodium bicarbonate and an excess of ice. Into this solution a concentrated solution of 34.8 parts of the sodium salt of 1-hydroxy-napthalene-3.6-disulfonic acid is allowed to run in slowly. The intermediate compound precipitates for the most part. Then 24.6 parts of the sodium salt of 1-hydroxy-napthalene-4-sulfonic acid are added to the suspension and the reaction is advantageously finished by warming the mass to a somewhat higher temperature. The new dyestuff is isolated in the customary manner by adding common salt. It corresponds to the formula:

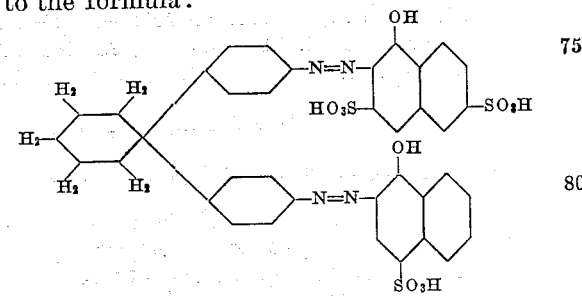

It yields on wool well even, bright bluish red shades of a good fastness to washing and light. The following table shows the shades of other asymmetrical disazo-dyestuffs prepared from the same tetrazo-compound and other combining components:

| First combining component | Second combining component | Shade |
| --- | --- | --- |
| 2-hydroxy-naphthalene-6.8-disulfonic acid. | 2-hydroxy-naphthalene-7-sulfonic acid. | Yellowish red. |
| 2-hydroxy-naphthalene-6.8-disulfonic acid. | 4-nitro-1.3-diamino-benzene. | Orange. |
| 1(4'toluene sulfamino)-8-hydryxy-naphthalene-3.6-disulfonic acid. | 1-hydroxy-naphthalene-4-sulfonic acid. | Bluish red. |
| 2-phenyl amino-8-hydroxy-naphthalene-6-sulfonic acid. | 1.3-diamino-benzene-4-sulfonic acid. | Brown. |

EXAMPLE 3

(*Production of poly-azo-dyestuffs by combining a monoazo-dyestuff*)

29.4 parts of 4.4'-diamino-3.3'-dimethyl-diphenyl-cyclohexane are tetrazotized as described in Example 1 and mixed with ice and a solution of about 60 parts of calcined soda. To this tetrazo-solution a solution of the monoazo-dyestuff, prepared in a mineral acid solution from the diazo-compound of 13.8 parts of para-nitraniline and 36.3 parts of the sodium salt of 1-amino-8-hydroxy-naphthalene-3.6-disulfonic acid, is added. The mixture is allowed to stand for some hours at a low temperature until the formation of the intermediate compound is completed. It is combined with a solution of 13.8 parts of salicyclic acid and 11 parts of calcined soda. The new trisazo-dyestuff thus formed corresponds to the formula:

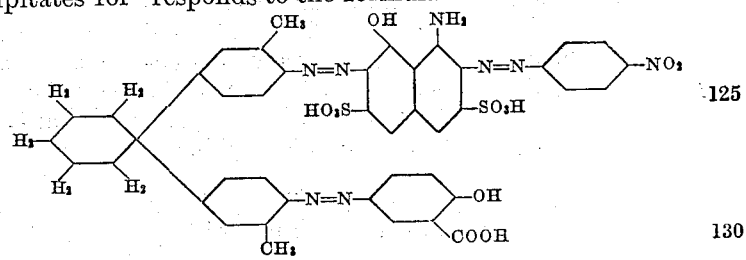

It dyes wool bluish green shades turning to yellowish green when afterchromed. The ordinary as well as the chromed dyeing show the same good properties as the dyestuffs mentioned herebefore.

In the following table similar dyestuffs are described which are obtainable by substituting salicylic acid by other end-components:

| End component | Shade |
| --- | --- |
| 1(4'sulfophenyl)-3-methyl-5-pyrazolone | Yellowish green. |
| 1-amino-8-hydroxy-naphthalene-4-sulfonic acid | Bluish black. |
| 2-amino-8-hydroxy-naphthalene-6-sulfonic acid | Full black. |

EXAMPLE 4

(*Production of polyazo-dyestuffs by diazotizing a disazo dyestuff containing an $NH_2$ group and coupling again*)

29.4 parts of 4.4'-diamino-3.3'-dimethyl-diphenyl-cyclohexane are tetrazotized as described in Example 1 and mixed with ice and 51 parts of sodium bicarbonate. Then a solution of 26.1 parts of the sodium salt of 2-amino-8-hydroxy-naphthalene-6-sulfonic acid are added and the intermediate compound is combined with 24.6 parts of the sodium salt of 1-hydroxy-naphthalene-4-sulfonic acid. The disazo-dyestuff is separated in the hot by the addition of common salt. It is diazotized at 5–10° in the form of a paste with 46 parts of hydrochloric acid of 22° Bé. and 6.9 parts of sodium nitrite and the diazo-compound is combined at 5° with a solution containing 14.4 parts of 2-hydroxy-naphthalene, 15 parts of caustic soda solution of 33° Bé. and 50 parts of calcined soda. The trisazo dyestuff thus obtained corresponds to the formula:

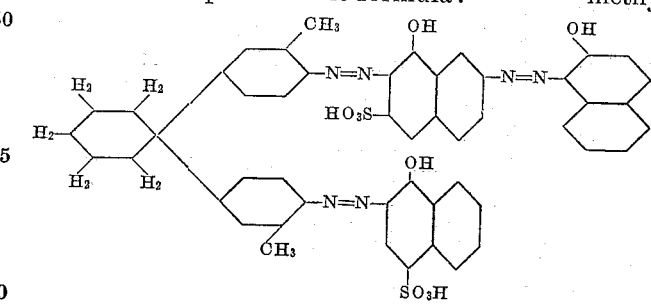

It dyes wool intensely red shades.

Another polyazo-dyestuff of this kind is obtained for instance by tetrazotizing 4.4'-diamino-3.3'-dimethoxy-diphenyl-cyclohexane, combining with 1 molecule of 1-amino-8-hydroxy-naphthalene-3.6-disulfonic acid and with 1 molecule of phenol and then further diazotizing this disazodyestuff and combining it with 4-nitro-1.3-diamino-benzene. This polyazodyestuff dyes wool fast dark brown shades.

EXAMPLE 5

(*Production of polyazo-dyestuffs by again diazotizing an intermediate compound*)

A tetrazo-solution of 4.4'-diamino-3.3'-dimethoxy-diphenyl-cyclohexane prepared as described above is made alkaline and combined with 1 molecule of the sodium salt of 1-amino-8-hydroxy-naphthalene-3.6-disulfonic acid. This intermediate compound is further diazotized and the new tetrazo-compound thus formed is combined with 2 molecules of 4-nitro-1.3-diamino-benzene. The trisazo-dyestuff corresponds to the formula:

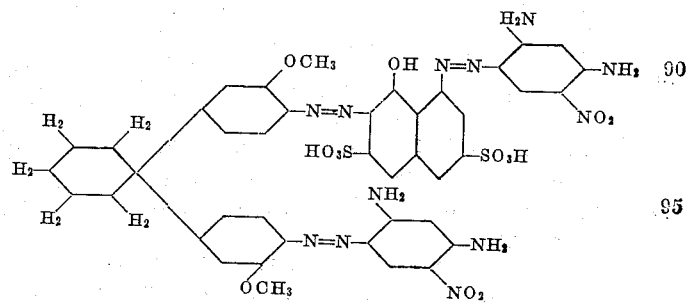

It dyes wool brown shades of an excellent fastness especially to milling.

An analogous polyazodyestuff is obtained by diazotizing the intermediate compound described in this example and combining the tetrazo-compound thus formed with 2 molecules of phenol. This dyestuff dyes wool fast blackish brown shades.

EXAMPLE 6

(*Production of symmetrical disazo-dyestuffs*)

30.8 parts of 4.4'-diamino-3.3'.3''-trimethyl-diphenyl-1.1'-cyclohexane (obtainable by condensing 1 molecule of 3-methyl-cyclohexanone with 2 molecules of ortho-touidine) are suspended while stirring in about 200 parts of water. The suspension is mixed with 69 parts of hydrochloric acid (specific gravity=1.15) and tetrazotized at nearly 0° with 13.8 parts of sodium nitrite. This tetrazo-solution is introduced into a solution cooled to 0° containing 52.4 parts of the sodium salt of 2.8-dihydroxy-naphthalene-6-sulfonic acid and 66 parts of calcined soda. The reaction is finished by feebly warming the mass and the dyestuff thus formed is precipitated by the addition of common salt and filtered off. It corresponds probably to the formula:

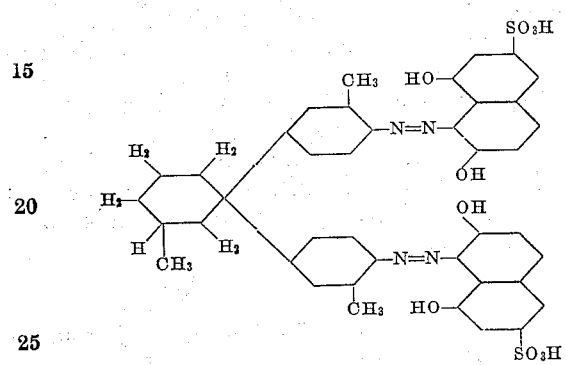

It represents a red powder dyeing wool and silk bluish red shades of an excellent fastness to light, washing, milling and perspiration.

We claim:

1. A process which comprises tetrazotizing a diamino-diphenyl-cyclohexane compound of the general formula:

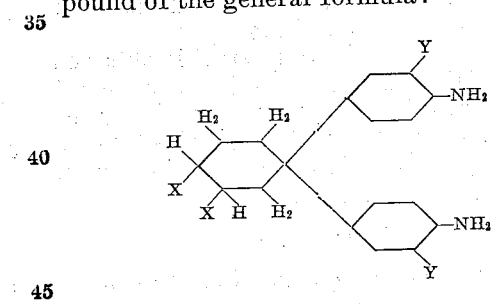

wherein X represents hydrogen or the methyl-group and the Y's stand for hydrogen, alkyl or alkoxy-groups, and combining the tetrazo-compound thus formed first with a naphthol-sulfonic acid of the general formula:

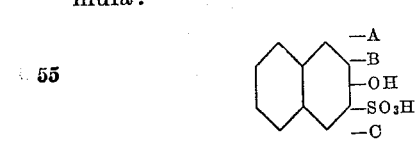

wherein A means hydrogen, OH or $NH_2$, B represents hydrogen or NH-acyl or O-acyl or $-N=N-$ aryl and C stands for hydrogen or a sulfonic acid group, and then with a second combining component which may be identical with the first one.

2. A process which comprises tetrazotizing a diamino-diphenyl-cyclohexane compound of the general formula:

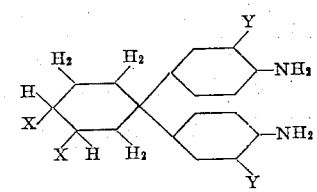

wherein X represents hydrogen or the methyl-group, and the Y's stand for hydrogen, alkyl or alkoxy-groups and combining the tetrazo-compound thus formed with 2 molecules of a naphthol-sulfonic acid of the general formula:

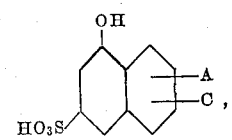

wherein A means hydrogen, OH, or NH-acyl or O-acyl and C stands for hydrogen or a sulfonic acid group.

3. A process which comprises tetrazotizing 4.4'-diamino-diphenyl-1.1'-cyclohexane compounds of the formula:

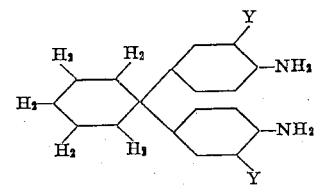

wherein Y means an alkyl or an alkoxy group and combining the tetrazo-compound thus formed with 2 molecules of 2.8-dihydroxy-naphthalene-6-sulfonic acid of the formula:

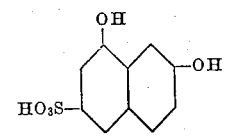

4. As new compounds the azodyestuffs corresponding to the general formula:

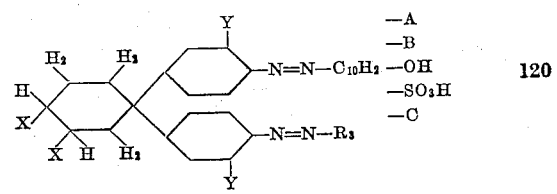

wherein X represents hydrogen or the methyl-group and the Y's stand for hydrogen, alkyl or alkoxy-groups, A means hydrogen, OH or $NH_2$, B means hydrogen or NH-acyl or O-acyl or $-N=N-$ aryl and C stands for hydrogen or a sulfonic acid group, and wherein $R_3$ is a second combining component which may be identical with the first one, which compounds are colored powder dyeing animal fibers different shades of an excellent fastness especially to washing, milling and perspiration.

5. As new compounds the azo-dyestuffs corresponding to the general formula:

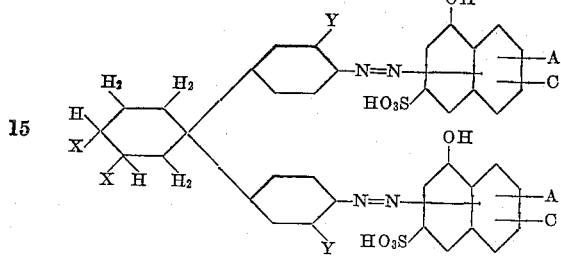

wherein X represents hydrogen or the methyl-group, the Y's stand for hydrogen, alkyl or alkoxy-groups, A means hydrogen, OH, $NH_2$, NH-acyl or O-acyl or $-N=N-$aryl and C stands for hydrogen or a sulfonic acid group, which compounds are colored powder dyeing animal fibers different shades of an excellent fastness especially to washing, milling and perspiration.

6. As new compounds the azo-dyestuffs corresponding probably to the general formula:

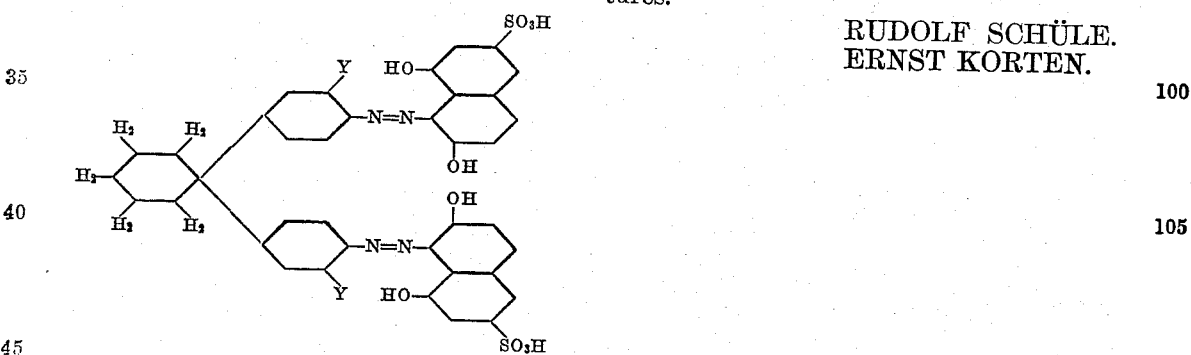

wherein Y means an alkyl- or alkoxy-group, which compounds represent when dry red powders dyeing animal fibers bluish red shades of an excellent fastness especially to light, washing, milling and perspiration.

7. As a new compound the azodyestuff corresponding probably to the formula:

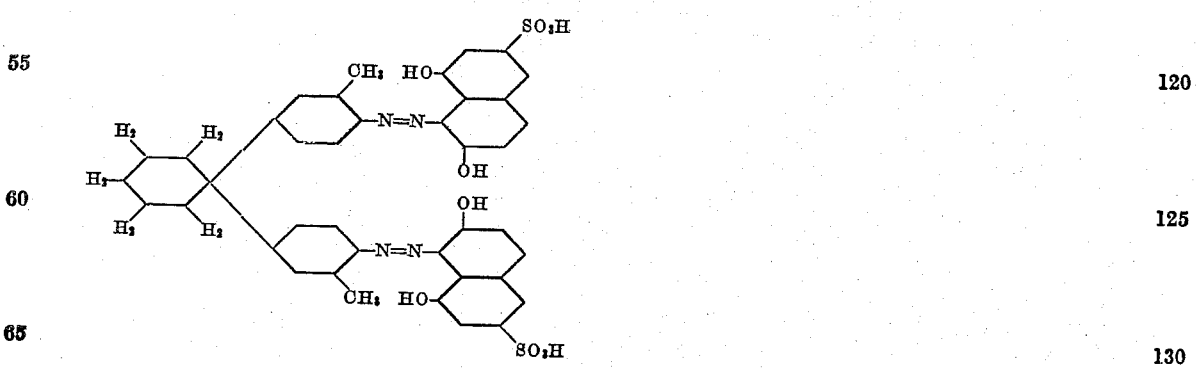

which compound represents when dry a red powder dyeing animal fibers bluish red shades of an excellent fastness especially to light, washing, milling and perspiration.

8. As new compounds the azo dyestuffs corresponding to the general formula:

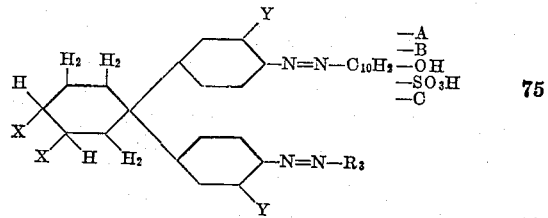

wherein X represents hydrogen or the methyl group, and the Y's stand for hydrogen, alkyl or alkoxy groups, A means hydrogen, OH or $NH_2$, B means hydrogen or NH-acyl or O-acyl or $-N=N-$aryl, and C stands for hydrogen or a sulfonic acid group, and wherein $R_3$ is a second combining component which is formed by the benzene or naphthalene or pyrazolone nucleus, and which component in each case contains the same substituents as the first combining component, characterized above, which compounds are colored powders dyeing animal fibers different shades of an excellent fastness especially to washing, milling and perspiration.

In testimony whereof, we affix our signatures.

RUDOLF SCHÜLE.
ERNST KORTEN.